US009203519B2

(12) United States Patent
Yaman et al.

(10) Patent No.: US 9,203,519 B2
(45) Date of Patent: Dec. 1, 2015

(54) PAIR-WISE SYMBOL CORRELATED HIGH RECEIVER SENSITIVITY MODULATION FORMAT

(71) Applicant: NEC Laboratories America, Inc., Princeton, NJ (US)

(72) Inventors: Fatih Yaman, Monmouth Junction, NJ (US); Shaoliang Zhang, Plainsboro, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignees: NEC Laboratories America, Inc., Princeton, NJ (US); NEC Corporation (JP)

( * ) Notice: Subject to any disclaimer, the term of this patent is extended or adjusted under 35 U.S.C. 154(b) by 40 days.

(21) Appl. No.: 14/044,298

(22) Filed: Oct. 2, 2013

(65) Prior Publication Data

US 2014/0099126 A1    Apr. 10, 2014

Related U.S. Application Data

(60) Provisional application No. 61/709,538, filed on Oct. 4, 2012, provisional application No. 61/710,800, filed on Oct. 8, 2012.

(51) Int. Cl.
*H04L 27/20* (2006.01)
*H04B 10/516* (2013.01)

(52) U.S. Cl.
CPC .......... *H04B 10/5161* (2013.01); *H04B 10/516* (2013.01)

(58) Field of Classification Search
USPC ................................. 375/302–308, 322–333
See application file for complete search history.

(56) References Cited

U.S. PATENT DOCUMENTS

| | | | | |
|---|---|---|---|---|
| 5,479,448 A | * | 12/1995 | Seshadri | 375/267 |
| 8,886,055 B1 | * | 11/2014 | Morero | 398/192 |
| 2003/0016768 A1 | * | 1/2003 | Huang et al. | 375/340 |
| 2004/0091061 A1 | * | 5/2004 | Liu | H04L 27/186 375/308 |
| 2011/0243266 A1 | * | 10/2011 | Roh | 375/261 |

FOREIGN PATENT DOCUMENTS

EP    2506459 A1    10/2012

* cited by examiner

*Primary Examiner* — Dac Ha
*Assistant Examiner* — Janice Tieu
(74) *Attorney, Agent, or Firm* — Joseph Kolodka

(57) ABSTRACT

The invention is directed to a novel computer implemented method for finding a modulation format that has better receiver sensitivity than modulation formats that are currently being used, with a correlated symbol modulation in which neighboring symbols are coded and decoded together to increase receiver sensitivity.

16 Claims, 3 Drawing Sheets

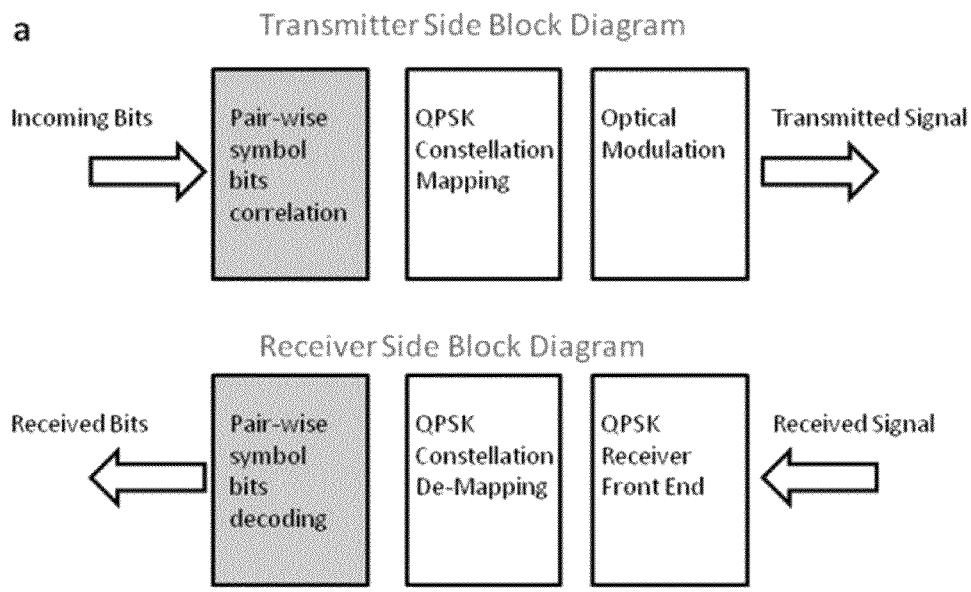
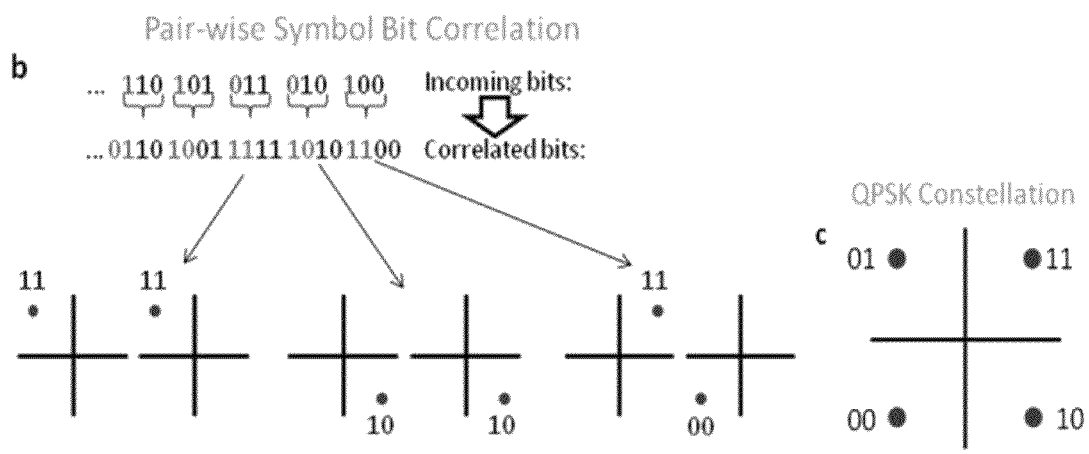
Fig. 1a
Fig. 1b, 1c

PAIR-WISE SYMBOL CORRELATED HIGH RECEIVER SENSITIVITY MODULATION FORMAT

This application claims the benefit of U.S. Provisional Application Nos. 61/709,538, filed Oct. 4, 2013 and 61/710,800, filed Oct. 8, 2012, of which the contents are incorporated herein by reference.

BACKGROUND OF THE INVENTION

The present invention relates generally to optics and, more particularly, to a pair-wise symbol correlated high receiver sensitivity modulation format.

The present invention attempts to solve the problem of finding a modulation format that would have better receiver sensitivity than modulation formats that are currently being used. In current, ultra long-haul transmission systems, especially in legacy links, the modulation formats that are most frequently used are BPSK and QPSK. The current invention introduces a new modulation format still based on QPSK constellation however, with a better receiver sensitivity than both BPSK and QPSK. Having a better receiver sensitivity allows for extending the transmission distance at the same capacity. It also allows for reducing the total energy consumption.

In transmission systems, it is very critical to choose the right kind of spectral efficiency for a given distance to maximize the capacity. In general the maximum achievable distance drops dramatically as the capacity is increased by increasing spectral efficiency. The present invention has the spectral efficiency of 1.5 b/s per polarization, which is 50% higher than BPSK, while maintaining the same receiver sensitivity. At the same bit rate, the current modulation format requires a lower baud-rate, in this case it will deliver the same capacity at a better receiver sensitivity, and therefore at a longer distance.

Since for a given transmission distance there is an optimum spectral efficiency that maximize the capacity it is important to adjust the spectral efficiency depending on the required transmission distance. The easiest way to adjust spectral efficiency is to switch between different modulation formats and constellation sizes. Since transceiver architectures depend heavily on the kind of modulation formats, it is very costly to design and operate transceivers which can modulate and demodulate multiple constellations. Therefore it is very cost effective to design a configuration that can easily switch between different modulation formats. One advantage of the proposed modulation format is that it requires a simple modification of transceivers designed for standard constellations.

Others have attempted to solve the above problem by reducing capacity by using simplest of the constellations such as BPSK. While others have introduced modulation formats with increased receiver sensitivity such as polarization-switched QPSK. However, compared to polarization-switched QPSK, the new modulation format has the following advantages:

1. It can use the same DSP platform as the standard QPSK transceivers.
2. The two polarization tributaries are independent which makes the transceiver design simpler and more robust.
3. It is possible to use polarization bit-interleaving which provides better nonlinearity tolerance especially at legacy links with lower baud rates
4. It is possible to have this modulation format in single polarization a opposed to polarization-switching.
5. It is possible to extend the benefits of this new modulation format to higher constellations.
6. This method can be implemented in time domain between two symbols which may or may not be adjacent, or in frequency domain between subcarriers as in the case of OFDM where the correlated subcarriers may be adjacent in frequency or not.

Accordingly, there is a need for finding a modulation format that would have better receiver sensitivity than modulation formats that are currently being used.

BRIEF SUMMARY OF THE INVENTION

In an aspect of the present invention, a computer implemented method for finding a modulation format with improved receiver sensitivity includes providing on a transmitter side of a communication system a pair-wise symbol bits correlation on incoming data bits; applying a quadrature phase shift keying QPSK constellation mapping to the pair-wise symbol bits correlation; and applying optical modulation the QPSK constellation mapped information for a transmitted signal.

In a preferred embodiment of the invention, the computer implemented method further includes receiving the transmitted signal at a QPSK receiver; applying a quadrature phase shift keying QPSK constellation de-mapping responsive to the QPSK receiver; and applying a pair-wise symbol bits decoding responsive to the QPSK constellation de-mapping to obtain the received bits.

In a similar aspect of the present invention, a computer system configured with instructions for finding a modulation format with improved receiver sensitivity includes providing on a transmitter side of a communication system a pair-wise symbol bits correlation on incoming data bits; applying a quadrature phase shift keying QPSK constellation mapping to the pair-wise symbol bits correlation; and applying optical modulation the QPSK constellation mapped information for a transmitted signal.

These and other advantages of the invention will be apparent to those of ordinary skill in the art by reference to the following detailed description and the accompanying drawings.

BRIEF DESCRIPTION OF THE DRAWINGS

FIG. 1a is a block diagram of a modified QPSK transmitter and receiver, in accordance with the invention;

FIG. 1b is diagram showing how 3 incoming bits are mapped onto 2 pairs of bits that are correlated, and then mapped onto QPSK constellations based on the constellation mapping shown in FIG. 1c, in accordance with the invention.

DETAILED DESCRIPTION

The invention is directed to a novel computer implemented method for finding a modulation format that has better receiver sensitivity than modulation formats that are currently being used, with a correlated symbol modulation in which neighboring symbols are coded and decoded together to increase receiver sensitivity.

FIG. 1a shows the flow diagram of the modified QPSK transmitter and the receiver. The red blocks show the modification required to convert a QPSK transceiver into correlated symbol transceiver. The correlated symbol modulation carries 1.5 bits per symbol, in other words only 3 bits per 2 symbols as opposed to the QPSK modulation where two symbols carry a total of 4 bits. The number of bits per symbol is reduced from 4 to 3 by introducing a correlation between each pair of symbols as it is described below.

FIG. 1b shows how the 3 incoming bits are mapped onto 2 pairs of bits that are correlated, and then mapped onto QPSK constellations based on the constellation mapping shown in FIG. 1c. The incoming bits are grouped in three bits. Each three bits is mapped onto two QPSK symbols. The first two bits (black) is mapped directly to the first symbol. The bits carried by the second symbol are determined by the first two bits and the third bit (red). If the third bit is 0, the second symbol also carries the same data as the first symbol. If the third bit is 1 the second symbol carries the opposite bits in the second symbol. Note that only each pair of symbols are correlated and neighboring pairs are completely independent as opposed to the correlations imposed by convolutional codes.

Figure 1D:
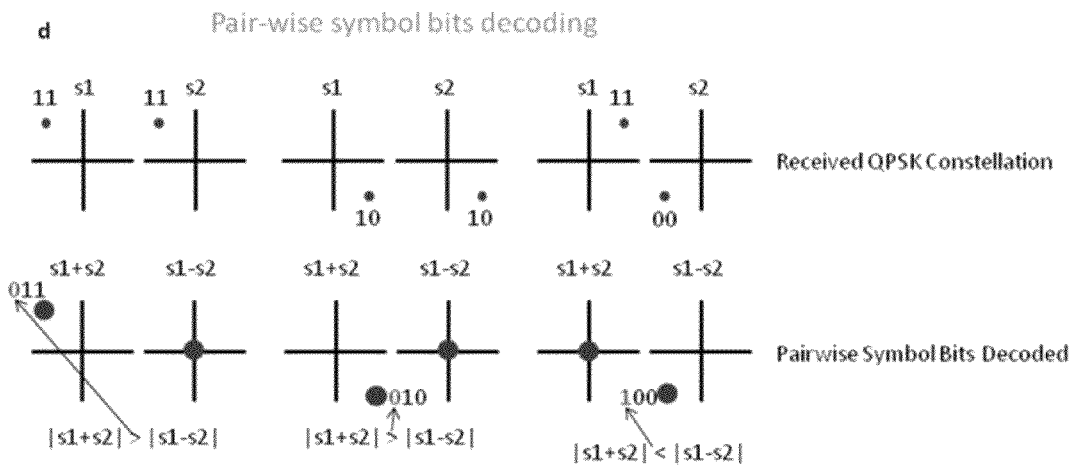
FIG. 1d is a diagram showing how the correlated-symbol symbols are decoded at the receiver after the standard QPSK DSP just before slicing, in accordance with the invention.

FIG. 1d shows how the correlated-symbol symbols are decoded at the receiver after the standard QPSK DSP just before slicing. The received symbols first go through the standard QPSK DSP, and the symbol constellations are obtained. The symbol pairs are determined based on the pairing at the transmitter. From each symbol pair, another pair of constellation is obtained by first adding them together, and then subtracting them. Since each pair contains either the same bits or opposite bits, either the summation is zero, or the subtraction is, and the other constellation is just twice the as the first symbol of the pair as shown in the FIG. 1d. Depending on whether the summation is larger than the subtraction the third bit (red) is determined first. The larger constellation also determines the first two bits (black). Since the summation or subtraction depending on the value of the third bit combines the power of the two symbols, all bits have 3 dB higher sensitivity compared to symbol by symbol detection. Compared to symbol by symbol detection, a 25% of the capacity is sacrificed however a 3 dB sensitivity is gained. Note that, capacity can be recovered by increasing the baud rate by 33%, which will reduce the sensitivity by 1.3 dB, in which case a sensitivity gain of about 1.7 will remain.

The above description would also hold for the case of OFDM, where the pair-wise correlation can be introduced between different subcarriers.

Figure 2:
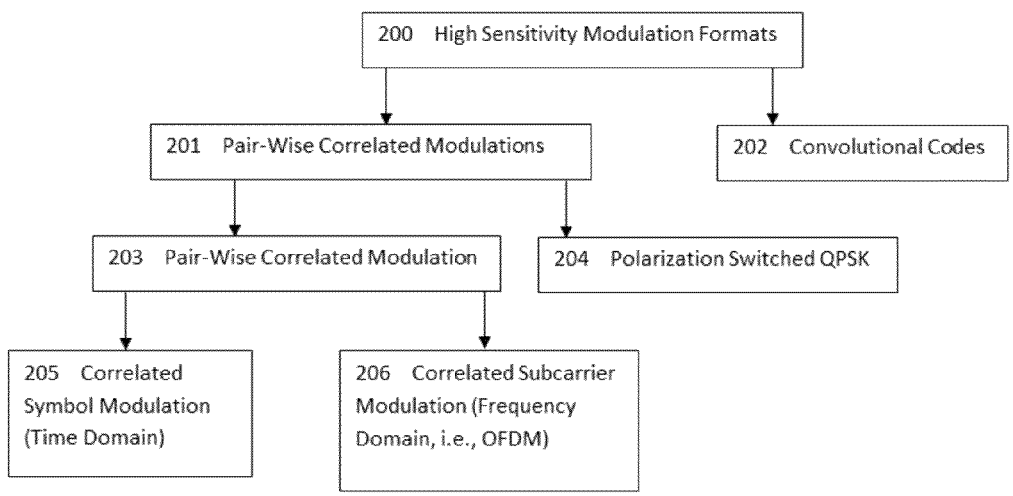
FIG. 2 is a diagram showing key aspects of the invention.

Referring to FIG. 2 and the above discussion, the invention technique for high-sensitivity modulation formats 200 entails a pair-wise correlated modulation 201 and convolutional codes 202. The pair-wise correlated modulations 201 include pair-wise correlated modulation 203 and polarization-switched quadrature phase shift keying QPSK 204. The pair-wise correlated modulation 203 entails correlated symbol modulation in the time domain 205 or correlated subcarrier modulation in the frequency domain, i.e., orthogonal frequency division multiplexing OFDM 206.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 3:
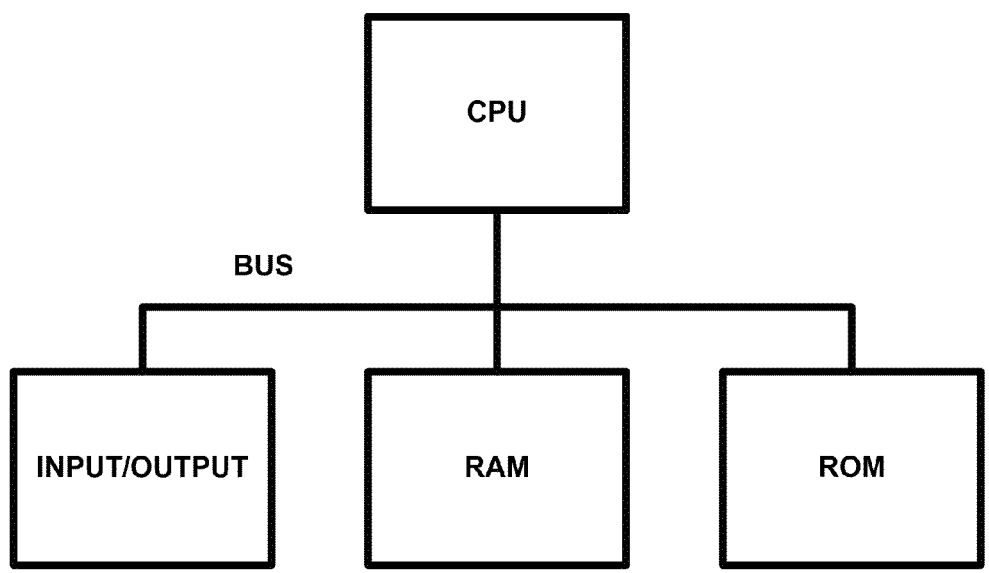
FIG. 3 is a diagram showing a generic computer configuration for carrying out the invention.

By way of example, a block diagram of a computer to support the system is discussed in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in one of or combination of analog or digital form over one or a number of communication links such as a serial link, local area network, wireless link, optical link and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can also be appreciated that the inventive modulation format has higher sensitivity than the most commonly used modulation formats such as DPBPSK and DPQPSK and that the inventive modulation format has similar sensitivity to modulation formats such as dual polarity-QPSK (DP-QPSK), however, the inventive modulation format also has the following advantages compared to polarization-switched QPSK.

I. It requires only a small modification in the standard QPSK transceiver design.
II. It allows for single polarization operation.
III. If polarization multiplexing is used, there is no strict path matching between the two polarization tributaries, which makes the transmitter and receiver design simpler.
IV. The modulation format can be applied in time domain or in the case OFDM it can be applied in the frequency domain.
V. The basic idea can be applied to higher modulation formats to gain sensitivity but also to provide flexibility in the receiver sensitivity and bit rate by small modification of the transceiver architecture.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional Information is provided in the accompanying "Appendix to the Specification". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for finding a modulation format with improved receiver sensitivity, comprising the steps of:
   providing on a transmitter side of a communication system a pair-wise symbol bits correlation on incoming data bits;
   applying a quadrature phase shift keying QPSK constellation mapping to the pair-wise symbol bits correlation; and
   applying optical modulation to the QPSK constellation mapped information for a transmitted signal;
   wherein 3 incoming bits are mapped onto 2 pairs of bits related to the pair-wise symbol bits that are correlated, and then mapped onto QPSK constellations based on the constellation mapping to the pair-wise symbol bits correlated, the incoming data bits are grouped in three bits with each three group bits being mapped onto two QPSK symbols;
   wherein first two bits of the 3 group bits are mapped directly to a first symbol of the two QPSK symbols and bits carried by a second symbol of the two QPSK symbols are determined by the first two bits and a third bit of the 3 group bits.

2. The computer implemented method for claim 1, further comprising:
   receiving the transmitted signal at a QPSK receiver;
   applying a quadrature phase shift keying QPSK constellation de-mapping responsive to the QPSK receiver; and
   applying a pair-wise symbol bits decoding responsive to the QPSK constellation de-mapping to obtain the received bits.

3. The computer implemented method of claim 2, wherein correlated-symbol symbols are decoded at the receiver after a standard QPSK digital signal processing DSP just before slicing comprises received symbols first going through the standard QPSK DSP for obtaining symbol constellations.

4. The computer implemented method of claim 1, wherein a correlated symbol modulation carries 1.5 bits per symbol, in other words only 3 bits per 2 symbols as opposed to the QPSK modulation where two symbols carry a total of 4 bits, the number of bits per symbol is reduced from 4 to 3 by introducing a correlation between each pair of symbols.

5. The computer implemented method of claim 1, wherein if the third bit is 0, the second symbol also carries the same data as the first symbol, if the third bit is 1 the second symbol carries the opposite bits in the second symbol, only each pair of symbols are correlated and neighboring pairs are completely independent as opposed to correlations imposed by convolutional codes.

6. A computer implemented method for finding a modulation format with improved receiver sensitivity, comprising the steps of:
   providing on a transmitter side of a communication system a pair-wise symbol bits correlation on incoming data bits;
   applying a quadrature phase shift keying QPSK constellation mapping to the pair-wise symbol bits correlation; and
   applying optical modulation the QPSK constellation mapped information for a transmitted signal;
   receiving the transmitted signal at a QPSK receiver;
   applying a quadrature phase shift keying QPSK constellation de-mapping responsive to the QPSK receiver; and
   applying a pair-wise symbol bits decoding responsive to the QPSK constellation de-mapping to obtain the received bits;
   wherein correlated-symbol symbols are decoded at the receiver after a standard QPSK digital signal processing DSP just before slicing, for obtaining symbol constellations;
   wherein symbol pairs in the symbol constellations are determined based on a pairing in the pair-wise symbol bits correlation at the transmitter and from each symbol pair, another pair of QPSK constellations are obtained by first adding bits in each of the symbol pairs together, and then subtracting the bits in each of the symbols pairs.

7. The computer implemented method of claim 6, wherein since each symbol pair of the symbol constellation contains either the same bits or opposite bits, either the summation is zero, or the subtraction is, and the other constellation is just twice the first symbol of the symbol pair.

8. The computer implemented method of claim 7, wherein depending on whether the summation is larger than the subtraction the third bit is determined first and the larger constellation determining the first two bits, and since the summation or subtraction depending on the value of the third bit combines the power of the two symbols, all bits have 3 dB higher sensitivity compared to symbol by symbol detection.

9. A computer system configured with instructions for finding a modulation format with improved receiver sensitivity, the computer system carrying out the following steps of:
   providing on a transmitter side of a communication system a pair-wise symbol bits correlation on incoming data bits;
   applying a quadrature phase shift keying QPSK constellation mapping to the pair-wise symbol bits correlation; and
   applying optical modulation to the QPSK constellation mapped information for a transmitted signal;
   wherein 3 incoming bits are mapped onto 2 pairs of bits related to the pair-wise symbol bits that are correlated, and then mapped onto QPSK constellations based on the constellation mapping to the pair-wise symbol bits correlated, the incoming bits are grouped in three bits with each three group bits being mapped onto two QPSK symbol;
   wherein first two bits of the 3 group bits are mapped directly to a first symbol of the two QPSK symbols and bits carried by a second symbol of the two QPSK symbols are determined by the first two bits and a third bit of the 3 group bits.

10. The computer system of claim 9, further comprising:
    receiving the transmitted signal at a QPSK receiver;
    applying a quadrature phase shift keying QPSK constellation de-mapping responsive to the QPSK receiver; and
    applying a pair-wise symbol bits decoding responsive to the QPSK constellation de-mapping to obtain the received bits.

11. The computer system of claim 10, wherein correlated-symbol symbols are decoded at a receiver after a standard QPSK digital signal processing DSP just before slicing comprises received symbols first going through the standard QPSK DSP for obtaining symbol constellations.

12. The computer system of claim 11, wherein symbol pair are determined based on a pairing at the transmitter and from each symbol pair, another pair of constellation being obtained by first adding them together, and then subtracting them.

13. The computer system of claim 12, wherein since each pair of the constellation contains either the same bits or opposite bits, either the summation is zero, or the subtraction is, and the other constellation is just twice the as the first symbol of the pair.

14. The computer system of claim 13, wherein depending on whether the summation is larger than the subtraction the third bit is determined first and the larger constellation determining the first two bits, and since the summation or subtraction depending on the value of the third bit combines the power of the two symbols, all bits have 3 dB higher sensitivity compared to symbol by symbol detection.

15. The computer system of claim 9, wherein a correlated symbol modulation carries 1.5 bits per symbol, in other words only 3 bits per 2 symbols as opposed to the QPSK modulation where two symbols carry a total of 4 bits, the number of bits per symbol is reduced from 4 to 3 by introducing a correlation between each pair of symbols.

16. The computer system of claim 9, wherein if the third bit is 0, the second symbol also carries the same data as the first symbol, if the third bit is 1 the second symbol carries the opposite bits in the second symbol, only each pair of symbols are correlated and neighboring pairs are completely independent as opposed to correlations imposed by convolutional codes.

\* \* \* \* \*